United States Patent
Ramezan Pour Safaei

(10) Patent No.: US 10,139,847 B2
(45) Date of Patent: Nov. 27, 2018

(54) SYSTEMS AND METHODS FOR CONTROLLING PV PRODUCTION WITHIN ENERGY EXPORT CONSTRAINTS

(71) Applicant: SolarCity Corporation, San Mateo, CA (US)

(72) Inventor: Farshad Ramezan Pour Safaei, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 286 days.

(21) Appl. No.: 15/158,415

(22) Filed: May 18, 2016

(65) Prior Publication Data

US 2017/0336821 A1 Nov. 23, 2017

(51) Int. Cl.
*G05F 1/67* (2006.01)
*G05B 15/02* (2006.01)

(52) U.S. Cl.
CPC ............... *G05F 1/67* (2013.01); *G05B 15/02* (2013.01); *Y02E 10/58* (2013.01)

(58) Field of Classification Search
CPC .................................. G05F 1/67; G05B 15/02
See application file for complete search history.

(56) References Cited

U.S. PATENT DOCUMENTS

| | | | | |
|---|---|---|---|---|
| 2010/0312412 A1* | 12/2010 | Haugh | | H02J 3/32 700/295 |
| 2011/0060474 A1* | 3/2011 | Schmiegel | | H02J 3/383 700/291 |
| 2011/0077786 A1* | 3/2011 | Vaidyanathan | | G01D 4/002 700/287 |
| 2011/0080044 A1* | 4/2011 | Schmiegel | | H02J 3/383 307/23 |
| 2013/0038122 A1* | 2/2013 | Broniak | | H02J 4/00 307/18 |
| 2014/0229031 A1* | 8/2014 | Amarin | | H02J 3/00 700/295 |

(Continued)

FOREIGN PATENT DOCUMENTS

| EP | 2544324 A1 * | 1/2013 | ............... H02J 3/14 |
|---|---|---|---|
| GB | 2462913 A * | 3/2010 | ............... H02J 3/32 |

OTHER PUBLICATIONS

H. Hatta, M. Asari and H. Kobayashi, "Study of energy management for decreasing reverse power flow from photovoltaic power systems," 2009 IEEE PES/IAS Conference on Sustainable Alternative Energy (SAE), Valencia, 2009, pp. 1-5.*

(Continued)

*Primary Examiner* — Christopher E. Everett
(74) *Attorney, Agent, or Firm* — Kilpatrick Townsend & Stockton LLP

(57) ABSTRACT

A method for controlling photovoltaic (PV) production and storage at a site is disclosed. The method includes monitoring a gross electric load and an actual PV output of the site over time and determining a net load at the site during a time period. The net load is then compared with a lower threshold and an upper threshold to determine a target PV output and a load of a controllable storage load such that the PV production and the controllable storage load at the site can be controlled accordingly to maximize the PV production while limiting or prohibiting feeding energy back to a utility grid.

20 Claims, 12 Drawing Sheets

(56) References Cited

U.S. PATENT DOCUMENTS

| | | | | |
|---|---|---|---|---|
| 2014/0265573 A1* | 9/2014 | Kreutzman | ........... | F24H 1/0018 |
| | | | | 307/31 |
| 2015/0097429 A1* | 4/2015 | Takenaka | ................. | H02J 7/35 |
| | | | | 307/22 |
| 2016/0072292 A1* | 3/2016 | Rogers | ..................... | H02J 3/46 |
| | | | | 307/62 |
| 2016/0329721 A1* | 11/2016 | Rogers | ..................... | H02J 11/00 |
| 2017/0288455 A1* | 10/2017 | Fife | .................... | H02J 13/0006 |
| 2017/0317528 A1* | 11/2017 | Fife | .................... | H02J 13/0006 |

OTHER PUBLICATIONS

H. Hatta et al., "Demonstration test of PV output reduction method using battery energy storage system and customer equipment," IEEE PES ISGT Europe 2013, Lyngby, 2013, pp. 1-5.*

M. Asari and H. Kobayashi, "Method of controlling reverse power flow of PV system with heat pump water heater," 2012 3rd IEEE PES Innovative Smart Grid Technologies Europe (ISGT Europe), Berlin, 2012, pp. 1-6.*

* cited by examiner

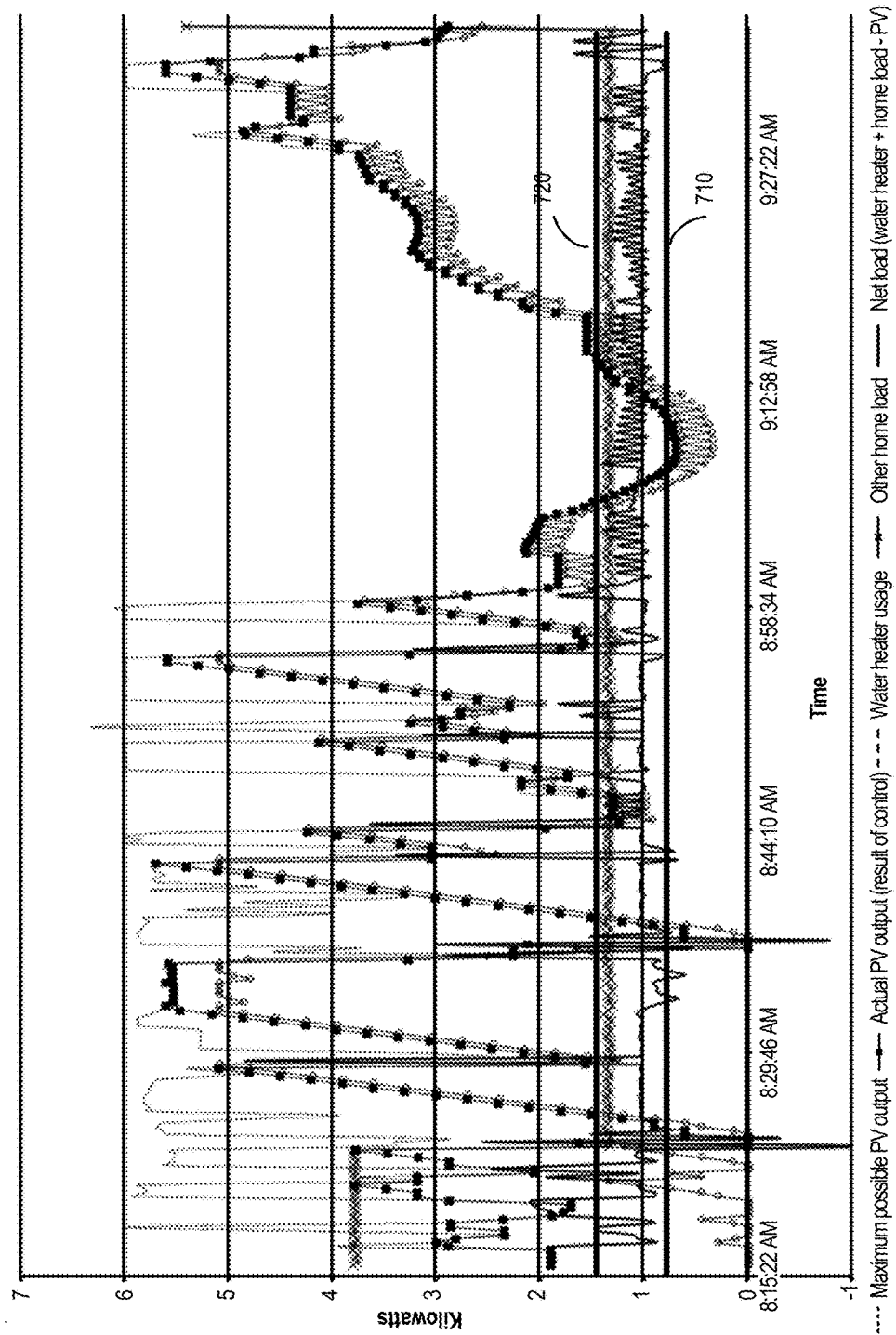

SYSTEMS AND METHODS FOR CONTROLLING PV PRODUCTION WITHIN ENERGY EXPORT CONSTRAINTS

BACKGROUND

In recent years, climate change concerns, federal/state initiatives, and other factors have driven a rapid rise in the installation of renewable energy generation (EG) systems (i.e., systems that generate energy using renewable resources such as solar, wind, hydropower, etc.) at residential and non-residential sites. Solar photovoltaic (PV) systems, in particular, have been very popular EG systems.

The majority of PV capacity is "grid-connected"—in other words, tied to the utility-maintained electrical grid. This allows site loads to be serviced from the grid at times when the PV system cannot generate sufficient energy, while enabling energy to be fed back into the grid at times when PV energy production exceeds the site loads, thereby allowing the energy to be conveyed to others on the grid.

To make economic sense to install a PV system, it is desirable to maximize the PV production. However, in some regions, some utility regulations limit or prohibit feeding energy back to the grid. In such regions, the amount of PV energy production should generally be limited to the site loads to avoid exporting energy to the grid. To maximize the PV production while avoiding violating export restrictions, it is desirable to have a PV system that can adjust its energy production in real-time in response to load changes.

BRIEF SUMMARY

Techniques disclosed herein provide an asymmetric control method that uses a lower threshold and an upper threshold for monitoring a net load (the gross electric load minus PV generation) of a PV system at a site. When the net load falls below the lower threshold, the PV system is at risk of exporting power to the grid, and the PV generation may be turned off. When the net load is above the upper threshold, the gross electrical load is sufficiently high that there is little or no risk that the PV generation will exceed the gross electrical load at the site. Thus, the PV generation may generally be set to generate PV power to the greatest extent possible while still keeping the net load at or above the lower threshold. In some embodiments, when the net load is above the upper threshold, the PV set point may be set to a value within a guard band of the gross electric load, such that the net load is approximately equal to the guard band value. When the net load is between the lower and the upper thresholds, the PV system may incrementally raise the PV generation and attempt to divert the increased power generated by the PV system to a controllable load, such as a smart electric water heater or a rechargeable battery. In some embodiments, this can be done by incrementally raising the PV set point and the controllable load set point and determining if the net load remains generally stable between the lower and the upper thresholds. If so, the PV set point can be increased further. If not, the PV set point may be reduced back to the previously set value. In this way, the PV system may generate maximum power usable at the site without violating export restrictions. Furthermore, according to embodiments of the disclosure, the lower threshold and the upper threshold can be set to a level such that, even if meter readings are noisy or if the PV generation and/or loads in the PV system fluctuate, energy is unlikely to be exported to the grid.

According to one embodiment, a method of controlling PV production and storage at a site having an inverter and a controllable storage load is disclosed. The method includes monitoring a gross electric load of the site and an actual PV output from the inverter over time. During a first time period, a net load at the site is determined with a processor based on the gross electric load and the actual PV output. The processor may compare the net load to at least one of a lower threshold or an upper threshold and control the PV production and storage based on the comparison. When the net load is below the lower threshold, the inverter may be controlled to turn off the PV production. When the net load is above the upper threshold, a set point of the inverter may be set to a target PV output determined based on the gross electric load and a first guard band value. When the net load is between the lower threshold and the upper threshold, the set point of the inverter may be increased and the controllable storage load may be controlled to increase its load by, for example, a same value as the increase of the set point of the inverter, such as a quarter of the lower threshold.

In some embodiments, the method of controlling PV production and storage at a site may also include repeating the control operations until a system end event occurs. The system end event may include at least one of a system maintenance, a system failure, or a user shut-off.

In various embodiments, the method of controlling PV production and storage at a site may also include controlling the controllable storage load, with the processor, to increase the load of the controllable storage load when the net load is below the lower threshold. The method may also include controlling the controllable storage load, with the processor, to reduce the load of the controllable storage load when the net load is above the upper threshold. In some cases, if the gross electric load minus the first guard band is greater than the nominal output power of the inverter, the set point of the inverter may be set to the nominal output power of the inverter. The method may also include comparing the actual PV output with the set point of the inverter when the net load is above the lower threshold, and, if the actual PV output is lower than the set point of the inverter, setting the set point of the inverter to a lower one of the actual PV output and the gross electric load minus a second guard band value.

In some examples, the lower threshold may be equal to or less than 5% of the inverter's nominal output power. The upper threshold may be equal to or greater than 10% of the inverter's nominal output power. The first guard band value may be equal to the lower threshold.

The controllable storage load may include an electrical water heater or a rechargeable battery. The processor may control the controllable storage load directly or by sending control information to a server communicatively coupled to the controllable storage load.

According to another embodiment, a system for controlling PV production and storage at a site is disclosed. The system may include a processor, an inverter communicatively coupled to the processor, a controllable storage load communicatively coupled to the processor, and at least one meter communicatively coupled to the processor. The processor may be configured to obtain a gross electric load of the site from the at least one meter and an actual PV output from the inverter, and determine a net load at the site based on the gross electric load and the actual PV output during a time period. The processor may compare the net load to at least one of a predetermined lower threshold or a predetermined upper threshold, and control the PV production and storage based on the comparison. When the net load is below the predetermined lower threshold, the processor may control the inverter to turn off PV production. When the net load is above the predetermined upper threshold, the processor may set a set point of the inverter to a target PV output determined based on the gross electric load and a first guard band value. If the gross electric load minus the first guard band is greater than the nominal output power of the inverter, the set point of the inverter may be set to the nominal output power of the inverter. When the net load is between the predetermined lower threshold and the predetermined upper threshold, the processor may increase the set point of the inverter and control the controllable storage load to increase a load of the controllable storage load.

In some examples, the first guard band value may be equal to the predetermined lower threshold. In some embodiments, increasing the set point of the inverter and the load of the controllable storage load when the net load is between the predetermined lower threshold and the predetermined upper threshold may include increasing the set point of the inverter by a first value, and controlling the controllable storage load to increase the load of the controllable storage load by the first value.

In various implementations, the controllable load may include at least one of an electrical water heater or a rechargeable battery.

According to yet another embodiment, an article comprising a non-transitory storage medium including machine-readable instructions stored thereon that are executable by a processor to monitor a gross electric load of a site from a meter and an actual PV output from an inverter at the site. The storage medium may also include instructions that are executable by the processor to determine a net load at the site based on the gross electric load and the actual PV output during a time period, and compare the net load to at least one of a lower threshold or an upper threshold. The storage medium may also include instructions that are executable by the processor to control PV production and storage at the site. When the net load is below the lower threshold, the inverter may be controlled to turn off PV production. When the net load is above the upper threshold, a set point of the inverter may be set to a target PV output determined based on the gross electric load and a first guard band value. When the net load is between the lower threshold and the upper threshold, the set point of the inverter and a controllable load of a controllable storage load may be increased in correlating control operations.

In some implementations, the first guard band value may be equal to the lower threshold. In some cases, if the gross electric load minus the first guard band is greater than the nominal output power of the inverter, the set point of the inverter may be set to the nominal output power of the inverter.

In various implementations of the article comprising a non-transitory storage medium including machine-readable instructions stored thereon, increasing the set point of the inverter and controlling a controllable storage load to increase a load of the controllable storage load in correlating control operations may include increasing the set point of the inverter incrementally by a first amount until the controllable storage load does not respond with a correlating load increase, and lowering the set point of the inverter by a second amount.

BRIEF DESCRIPTION OF THE DRAWINGS

The detailed description is set forth with reference to the accompanying figures.

FIG. 7B is a zoomed-in view of the example simulation results of FIG. 7A.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiments being described.

Embodiments of the present disclosure provide systems and methods for maximizing PV generation, shifting energy usage, and minimizing energy exported to the utility grid. More specifically, techniques disclosed herein provide an asymmetric control system that uses a lower threshold and an upper threshold for monitoring a net load (gross electric load—PV generation) of a PV system at a site. When the net load falls below the lower threshold, which indicates that the PV system is at risk of exporting power to the grid, the PV generation can be turned off to avoid exporting power to the grid. When the net load is above the upper threshold, which indicates that the load is sufficiently higher than the current PV generation, the PV generation may be set to a value equal to the gross electric load minus a guard band value, such as the lower threshold value, if the value is less than or equal to the maximum power rating of the inverters, such that the net load is approximately equal to the guard band value. When the net load is between the lower threshold and the upper threshold, the PV system may incrementally increase the PV generation and a controllable load, such as an electric water heater or a rechargeable battery, so long as the net load is between the lower threshold and the upper threshold. In this way, the PV system may generate increased usable power at the site without violating export restrictions, even if meters used in the PV system are not accurate or if the PV generation and/or loads in the PV system fluctuate when the weather condition changes and/or home appliances are turned on or off.

I. System Environment Example

The following section describes an example system environment in which PV production may be controlled. It should be appreciated that the example system environment is illustrative and not intended to limit embodiments of the present disclosure.

Figure 1:
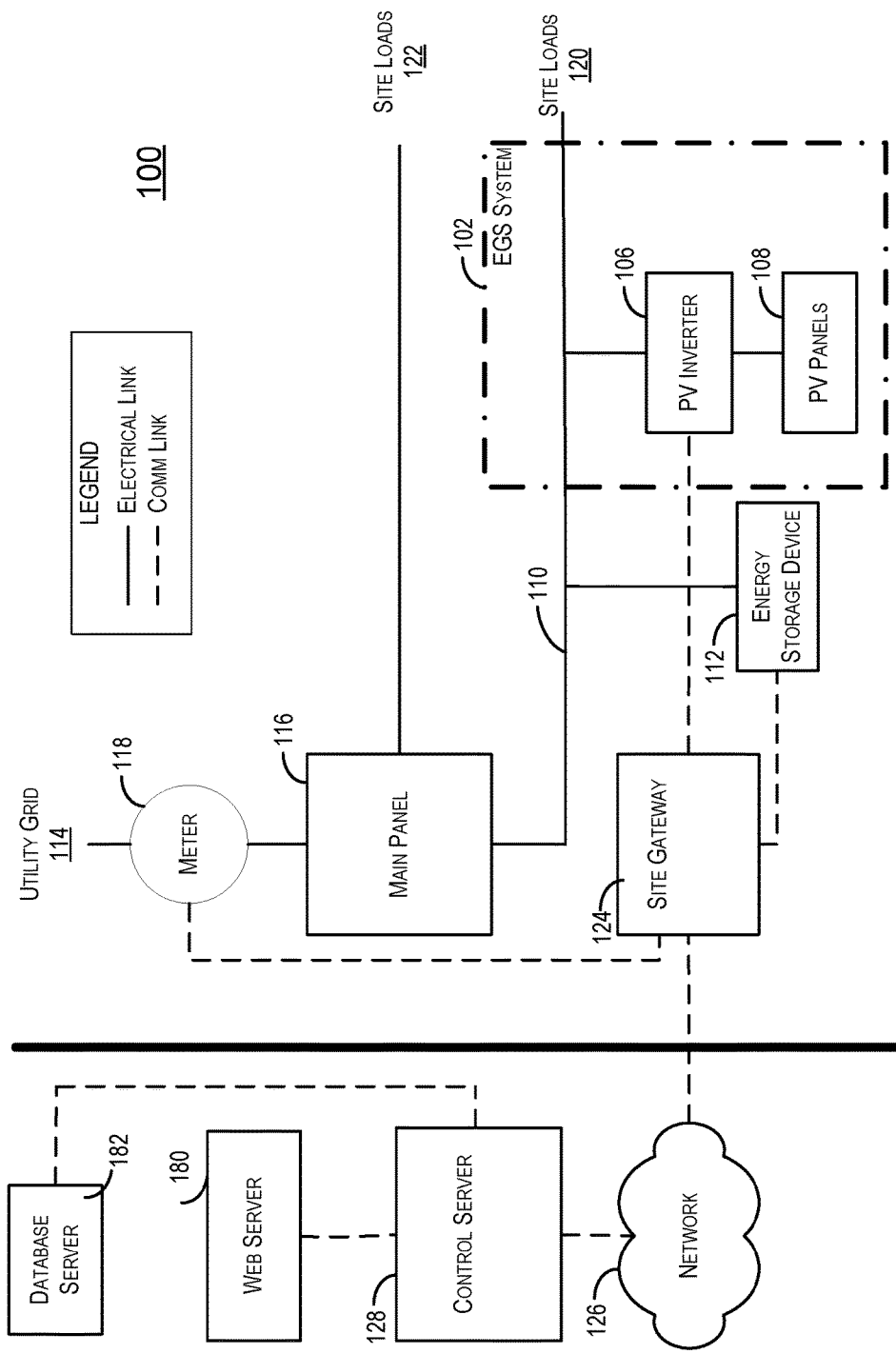
FIG. 1 illustrates a simplified block diagram of an example grid-connected PV energy generation system environment in accordance with some embodiments.

FIG. 1 illustrates a simplified block diagram of grid-connected energy generation system environment 100 according to an embodiment of the present disclosure. As shown, system environment 100 includes energy generation and storage (EGS) system 102 that is installed at site 104, for example, a residence, a commercial building, etc. EGS system 102 may include a PV-based energy generation subsystem comprising PV inverter 106 and one or more PV panels 108, as well as a battery-based energy storage subsystem comprising battery inverter/charger 110 and/or energy storage device 112, such as a battery. In some embodiments, PV inverter 106 and battery inverter/charger 110 can be combined into a single device. In the example of FIG. 1, EGS system 102 is grid-connected; thus, PV inverter 106 and battery inverter/charger 110 may be electrically connected to utility grid 114, for example, via main panel 116 and utility meter 118 at site 104. Further, to provide power to site 104, utility grid 114, PV inverter 106, and/or battery inverter/charger 110 may be electrically connected to site loads 120 and 122.

In some examples, integrated EGS systems, such as system 102, may provide a number of advantages over energy generation systems that do not incorporate any on-site energy storage device. For example, energy storage device 112 can be leveraged to shift time of use (ToU) of energy at site 104 in a way that provides economic value to the site owner or the installer/service provider of the EGS system 102. For instance, battery inverter/charger 110 can charge the battery device 112 with energy from utility grid 114 and/or PV inverter 106 when grid energy cost is low and/or the site load is low. Battery inverter/charger 110 can then dispatch the stored energy at a later time to, e.g., offset site energy usage from utility grid 114 when PV energy production is low or grid energy cost is high or sell the energy back to the utility when energy buyback prices are high, for example, during peak demand times.

In some embodiments, system environment 100 includes site gateway 124 and control server 128. Site gateway 124 may be a computing device (e.g., a general purpose personal computer, a dedicated device, etc.) that is installed at site 104. As shown, site gateway 124 may be communicatively coupled with on-site components 106, 110, 112, and 118, as well as with control server 128 via network 126. In some aspects, site gateway 124 may include a wired or wireless network adaptor, such as an Ethernet adapter, an IEEE 802.11 compliant adapter, a ZigBee® protocol adapter, or the like for communicating over network 126. In some embodiments, site gateway 124 can be a standalone device that is separate from EGS system 102. In other embodiments, site gateway 124 can be embedded or integrated into one or more components of system 102. Control server 128 may be a server computer (or a cluster/farm of server computers) that is remote from site 104. Control server 128 may be operated by, for example, the installer or service provider of EGS system 102, a utility company, or some other entities. Network 126 may comprise a public network, such as the Internet, a private network, a virtual private network (VPN), and/or the like with wired and or wireless network connection.

In some embodiments, site gateway 124 and control server 128 can carry out various tasks for monitoring and controlling the performance of EGS system 102. For example, site gateway 124 may collect system operating statistics, such as the amount of PV energy produced (via PV inverter 106), the energy flow to and from utility grid 114 (via utility meter 118), the amount of energy stored in energy storage device 112, and so on. Site gateway 124 may then send this data to control server 128 for long-term logging and system performance analysis.

More significantly, site gateway 124 and control server 128 can operate in tandem to actively facilitate the deployment and control of EGS system 102. Specifically, FIG. 1 shows other entities remote from the site (OFF SITE) that may communicate with EGS system 102. These other entities may include web server 180 and database server 182.

It should be appreciated that system environment 100 is illustrative and not intended to limit embodiments of the present disclosure. For instance, although FIG. 1 depicts control server 128 as being connected with a single EGS system (102) at a single site (104), control server 128 can be simultaneously connected with a fleet of EGS systems that are distributed at multiple sites. In these embodiments, control server 128 can coordinate the scheduling of various systems/sites to meet specific goals or objectives. In further embodiments, the various components depicted in system environment 100 can have other capabilities or include other subcomponents that are not specifically described. Furthermore, multiple instances and variants of the control server may exist, each communicating with one or more other control servers, EGS systems and/or other devices connected to EGS system 102. One of ordinary skill in the art will recognize many variations, modifications, and alternatives.

II. Energy Export Restrictions

To make a PV system profitable such that it makes sense to install a PV system at a site, it is desirable to maximize the PV production at the site. However, in some regions, such as some parts of Hawaii, policy and/or technical issues may drive the utility company that serves the region to restrict some customers with solar panels from sending power back to the grid or even turning on their solar systems. In other instances, such technical issues may force customers onto multi-year waiting lists to install solar system because of claims that the grid cannot accommodate additional solar energy production in their area.

Installing solar panels may still be very attractive to customers in regions, states or countries in spite of the aforementioned technical or policy issues. For example, in Hawaii, most or all of the fuel required to generate electricity must be imported, increasing the cost of fuel generated electricity as compared to other states. Similarly, the geography of Hawaii and certain regions can increase the expenses required to build power lines, which can also contribute to a high cost of electricity in the region. If such regions enjoy plentiful sunshine, solar electricity can be relatively inexpensive and can be an attractive source of electrical power. Therefore, many customers in restricted regions such as Hawaii may opt to install solar systems despite the restrictions.

Additionally, if a region is electrically isolated from other regions, the utility grid may not be able to absorb extra solar power and may not be able to otherwise backup or store the extra power. Thus, if the existing power plants in such an isolated region do not have the flexibility to make up for the variability introduced by solar systems, there is nothing the grid operator can do to access other, more flexible electricity resources. Such conditions can result in a utility company formally restricting the number of new customers that can install solar panels that may feed electricity back into the grid or implementing other controls. For example, imposing a penalty if PV energy from an individual customer is exported back to the grid, or if more than a small, capped amount of energy is exported to the grid.

Therefore, a PV control system is needed to control the PV production and the operation of the energy storage devices such that relatively more PV energy may be generated (1) without exporting energy to a utility grid or (2) otherwise operating within policy-based or technical non-export limitations.

III. Example System for PV Production Control

Embodiments of the present disclosure provide example systems that can be used to maximize PV generation, shift energy usage, and limit energy export to the utility grid. In some examples, an asymmetric control system that uses a lower threshold and an upper threshold for monitoring a net load (the gross electric load minus PV generation) of a PV system at a site is used. When the net load falls below the lower threshold, which indicates that the PV system is at risk of exporting power to the grid, the PV generation may be turned off or otherwise curtailed to avoid exporting power to the grid. When the net load is above the upper threshold, which indicates that the load is sufficiently higher than the current PV generation, the PV generation may be set to a value equal to the gross electric load minus a guard band value, such that the net load is approximately equal to the guard band value. When the net load is between the lower and the upper threshold, the PV system may gradually increase the PV generation and a controllable load, such as an electric water heater or a rechargeable battery. As a result, the PV system may generate more usable power than the present operating load at the site without violating the non-export regulation even if meters used in the PV system are not accurate or if there are fluctuations in the PV generation and/or loads at the site.

Figure 2:
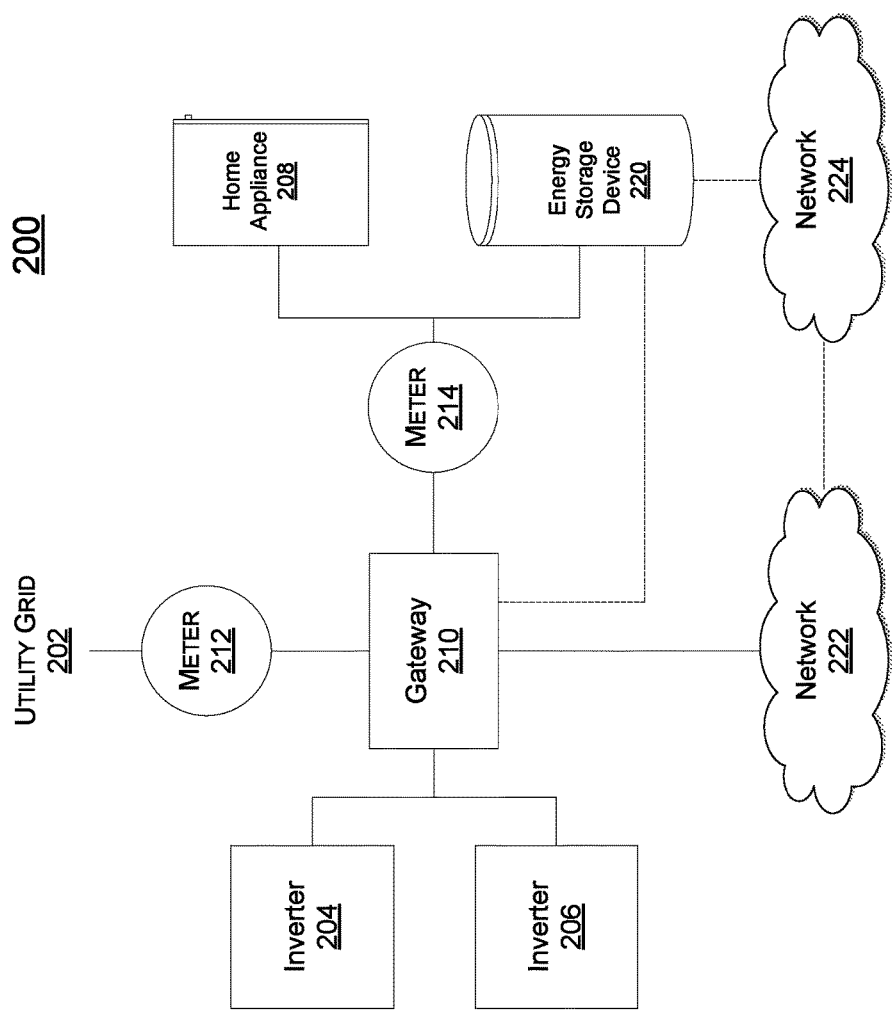
FIG. 2 is a simplified block diagram illustrating an example control system for controlling PV production according to some embodiments.

FIG. 2 is a simplified block diagram illustrating an example system 200 for controlling PV production according to some embodiments of this disclosure. System 200 includes gateway 210, one or more meters 212 and 214, and one or more inverters 204 and 206. The meters and the inverters are communicatively coupled to gateway 210 through, for example, wired connections (such as Ethernet, controller area network (CAN), RS232, RS485, etc.) or wireless connections (such as ZigBee®, Wi-Fi, WiMax, cellular, etc.). Gateway 210 may be connected to network 222, which may include a network, such as a virtual private network (VPN), of a PV system installer or provider, for example, a utility company. Network 222 may be connected to one or more servers, such as control server 128, web server 180, and database server 182 of FIG. 1.

Meter 212 may be connected to a utility grid 202 for measuring the total electrical power (net load) from the utility grid that is used by a site or the electrical power sent from the site to the utility grid. Meter 212 may be optional for a control system in some implementations. Meter 214 may be electrically connected to home appliances 208 for measuring energy/power usage by home appliances 208, such as TVs, computers, refrigerators, lamps, air conditioners, water heater, electrical range, and so on. Meter 214 may include one or more meters that are connected to home appliances 208. In some embodiments, meter 212 may measure the gross load at the site, and meter 214 may or may not be present.

Meter 214 may also be electrically connected to energy storage device 220, such as a rechargeable battery or an electrical water heater (EWH). The rechargeable battery may be a lead acid battery, a lithium-ion battery, an organic battery, a vanadium redox flow battery (VRFB), or other battery types. The rechargeable battery may be charged when the gross electric load of the site is less than the PV production, for example, in the middle of the day. The stored electrical energy may then be used at night or in the morning when the gross electric load is higher than the PV production.

A major energy-consuming home appliance is the water heater, which may be used more frequently in the morning or at night. Water has a high heat capacity of about 4.2 J/(cm$^3$·K). Thus, an EWH may be an efficient and economical device for storing a large amount of energy. The water in the EWH may be pre-heated electrically during the daytime by converting the excess electricity generated by the PV production into thermal energy stored in hot water that can be used in the morning or at night. The EWH may have a lower and an upper temperature threshold. When the temperature of the water in the EWH is below the lower temperature threshold, the EWH may be turned on automatically. On the other hand, when the temperature of the water in the EWH is above the upper temperature threshold, the EWH may be turned off automatically.

In some implementations, energy storage device 220 may also be an electrical heater or an air conditioner. For example, during the day time, a house may be pre-heated or pre-cooled during the day time using excess energy generated from a PV system, thus reducing the energy used for heating or cooling at night.

In some implementations, the PV production may be used in a prioritized order. For example, the PV production may be used to provide power to the home appliances first. Excess PV energy may then be consumed by the EWH. If there is still PV energy remaining, the rechargeable battery may be charged by the remaining PV energy.

Figure 3:
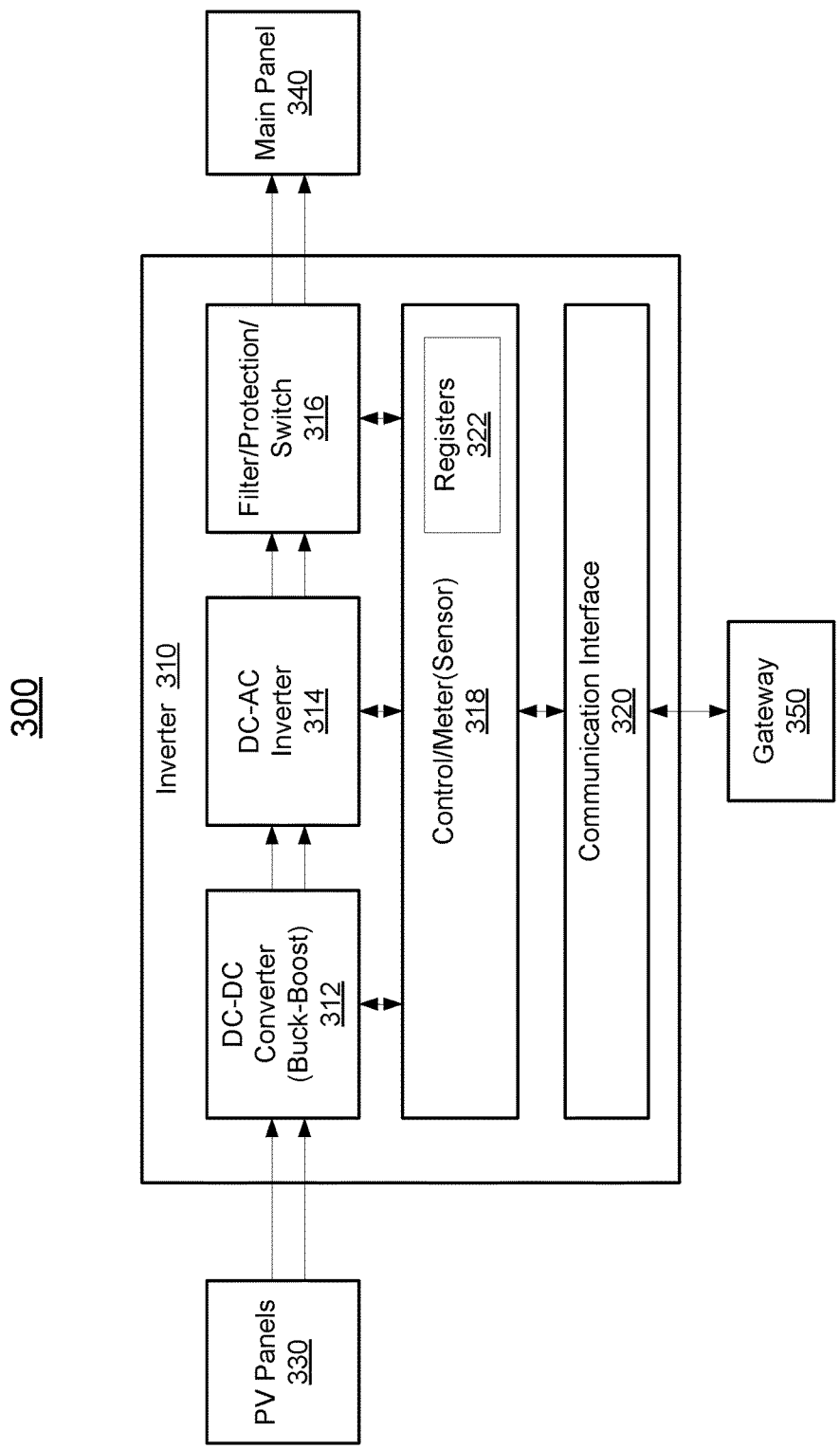
FIG. 3 is a block diagram of an example inverter with controllable PV output according to some embodiments.

Inverters 204 and 206 may include current (I) and voltage (V) control and sensing circuits and thus may be able to measure the PV output power generated by the PV panels (not shown in FIG. 2) and send the measured PV output power information to gateway 210 through the wired or wireless connections described above. An example inverter is illustrated in FIG. 3 and described below in detail. A site may include one or power inverters. For example, if the power rating of an inverter is 6 KW and a site may need about 12 KW or more in peak hours, two or more inverters may be installed at the site to provide the required power.

Gateway 210 may send dynamic control commands to inverters 204 and 206 and read PV production measurements from inverters 204 and 206 using, for example, specific registers of inverters 204 and 206. Gateway 210 may locate and communicate with the inverters based on the serial numbers or media access control (MAC) address of the inverters, get readiness status of the inverters, get instantaneous PV production of the inverters, and send dynamic control commands, such as PV set points and fallback limits, to the inverters. Gateway 210 may determine the control commands to the inverters locally (centralized control) or may send the collected information to a server through network 222, which may then determine the control settings for the inverters and transmit the determined control settings to gateway 210 for sending to the inverters (distributed control).

Gateway 210 may monitor the readings of the gross electric load and/or net load that are gathered regularly by meters 212 and 214 and inverters 204 and 206. For example, Gateway 210 may find and communicate with meters based on the serial numbers of the meters, get meter locations (e.g., utility or consumption), get readiness status of the meters, and poll the meters regularly to get instantaneous meter readings. For example, in some implementations, gateway 210 may sample the meter and inverters readings at a sampling rate equal to two times the total number of inverters and meters. In some implementations, gateway 210 may read from each meter or inverter every second, every half-second, every 0.1 second or shorter.

Gateway 210 may directly communicate with energy storage device 220 that has a controllable load to set the load on energy storage device 220 using various wired or wireless connections as described above. In some implementations, gateway 210 may send information collected from the inverters and meters to network 222, which may determine the appropriate setting of energy storage device 220, and send the determined setting to energy storage device 220 through a network 224. Network 224 may be a network of an energy storage device provider, such as an electric water heater manufacturer. A delay between the command to the inverters and the command to energy storage device 220 may be adjusted as needed.

FIG. 3 is a block diagram of an example inverter 310 with controllable PV output in an exemplary solar energy generation system 300 according to some embodiments. In system 300, DC current from PV panels 330 is sent to inverter 310. Inverter 310 may perform DC-DC conversion using DC-DC converter 312 and DC-AC conversion using DC-AC inverter 314, and send the AC electrical power to main panel 340, such as main panel 116 described above with respect to FIG. 1, through filter/protection/switch circuit 316. Inverter 310 may also include a control/meter circuit 318 for measuring I/V signals on the path from PV panels 330 to main panel 340, and controlling the I/V levels and thus the output power of inverter 310. Inverter 310 may also include communication interface 320 for sending data to and receiving command from gateway 350 using wired or wireless communication techniques. Inverter 310 may be a central inverter, a string inverter, or a microinverter that works directly and independently under each solar panel.

PV panels 330 may include a plurality of PV panels connected serially with an additive direct current (DC) voltage between about 100 and about 1000 volts, depending on factors such as the number of panels, the efficiencies of the panels, the output ratings of the panels, ambient temperature, and solar irradiation on the panels. In some embodiments, when the high voltage DC current is sent to the inverter, it is subject to maximum power-point tracking (MPPT) at the string level or at the module level to optimize the voltage/current operating points. In some embodiments, inverter 310 may perform the MPPT function.

DC-DC converter 312 may be used to raise or lower the voltage supplied to DC-AC inverter 314 for efficient inversion. In some embodiments, inverter 310 may include a DC link bus attached to a battery pack so that the DC power coming from the strings can be delivered directly to the battery pack to charge the battery. Because the battery pack has a maximum input voltage lower than the maximum DC voltage from PV panels 330, DC-DC converter 312 may include a buck-boost circuit to limit the DC voltage below the maximum input voltage of the battery pack.

DC-AC inverter 314 may convert DC electricity to AC electricity at a desired voltage and frequency for use by home appliances or for exporting to the utility grid. For example, the converted AC electricity may have a root-mean-square amplitude of 115 or 230 volts and a frequency of 60 Hertz, or a root-mean-square amplitude of 220 volts and a frequency of 50 Hz. DC-AC inverter 314 may be a transformer-less inverter using, for example, metal-oxide-semiconductor field-effect transistors (MOSFETs), insulated-gate bipolar transistors (IGBTs), and pulse-width modulation (PWM) technique.

High frequency noise that may be present in the output of DC-AC inverter 314 can be filtered by filter/protection/switch circuit 316. Filter/protection/switch circuit 316 may also provide isolation or protection between the PV generation system and the utility grid and home appliances. For example, filter/protection/switch circuit 316 may disconnect or switch off inverter 314 from the utility grid to prevent the PV system from powering a utility that has been disconnected, for example, to conform with safety standard specifications of IEEE 1547 and UL 1741.

Control/meter circuit 318 may include, for example, a digital power controller (DPC) or a digital signal processor (DSP) that can provide a high computational performance and a programming flexibility for real-time signal processing. Control/meter circuit 318 may include firmware implemented in, for example, a state machine format, and registers 322 for controlling and sensing different functional blocks in inverter 310. Control/meter circuit 318 may also include current/voltage sensors and/or analog-to-digital converters (ADCs) for current and voltage sensing. Control/meter circuit 318 may also include PWM channels providing variable duty cycles for high-speed switching. Each of the PWM channels may have a timer and a phase register for programming phase delay. Control/meter circuit 318 may control the output power of inverter 310 by adjusting the PWM or the current/voltage levels of the functional blocks such as DC-AC inverter 314, DC-DC converter 312, and filter/protection/switch circuit 316.

Communication interface 320 may communicate with gateway 350 using wired connections (such as Ethernet, CAN, RS232, RS485, etc.) or wireless connections (such as ZigBee®, Wi-Fi, WiMax, cellular, etc.) as described above.

Inverter 310 may have a ramp time of, for example, 10-12 seconds; that is, it may take 10-12 seconds for the output power of the inverter to increase from zero to the maximum output power rating or vice versa. In some embodiments, the ramp time of the inverter may be used in determining how often a control command may be issued to the inverter and/or the maximum amount of change in the target output power between two consecutive control commands.

IV. Example Methods for PV Production Control

Figure 4:
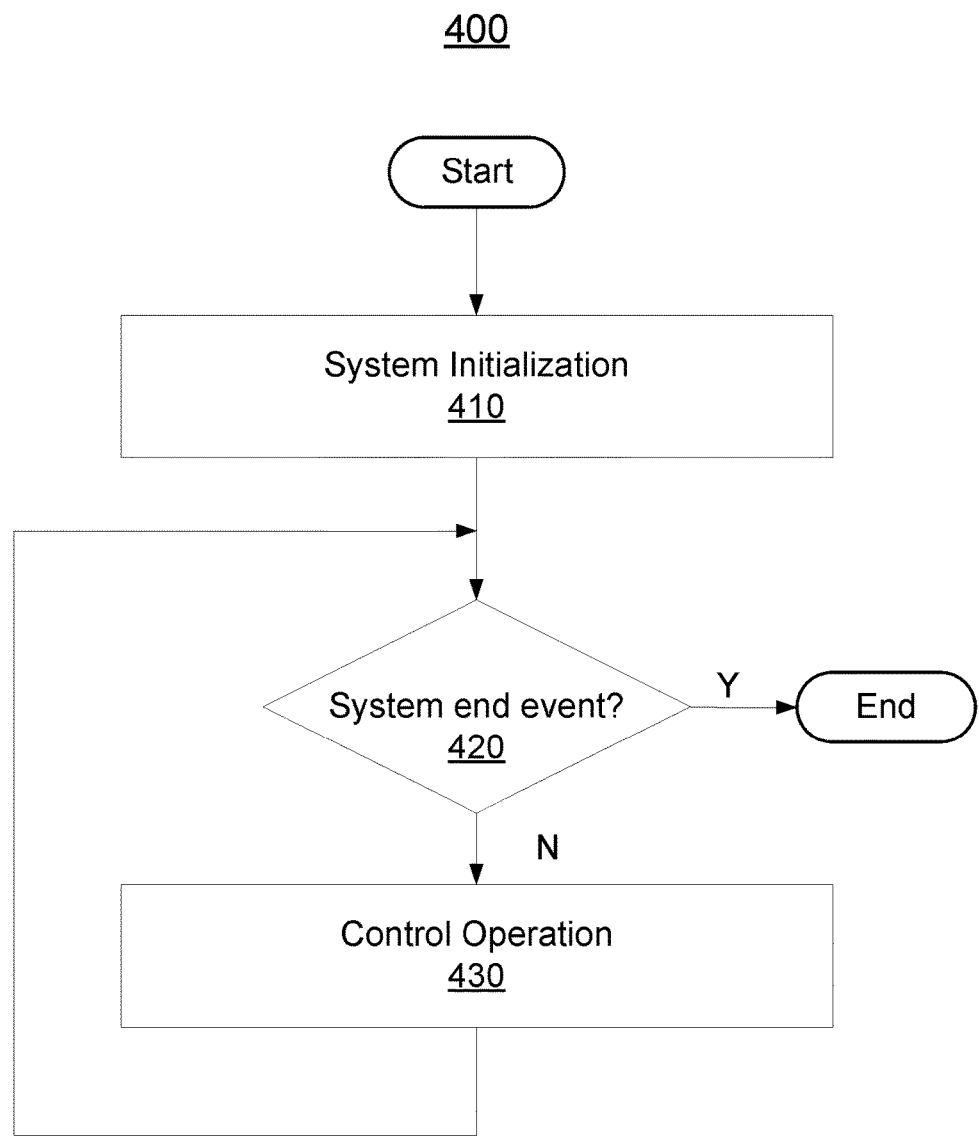
FIG. 4 is a simplified flow chart illustrating an example process for controlling PV production.

FIG. 4 is a simplified flow chart illustrating an example process 400 for controlling PV production in, for example, system 100 of FIG. 1 or system 200 of FIG. 2. In process 400, the gross electric load, PV output, and/or net load of a site may be monitored continuously and new set points for inverters and energy storage devices with controllable load may be set regularly to maximize PV production and prevent exporting energy back to the grid.

Figure 9:
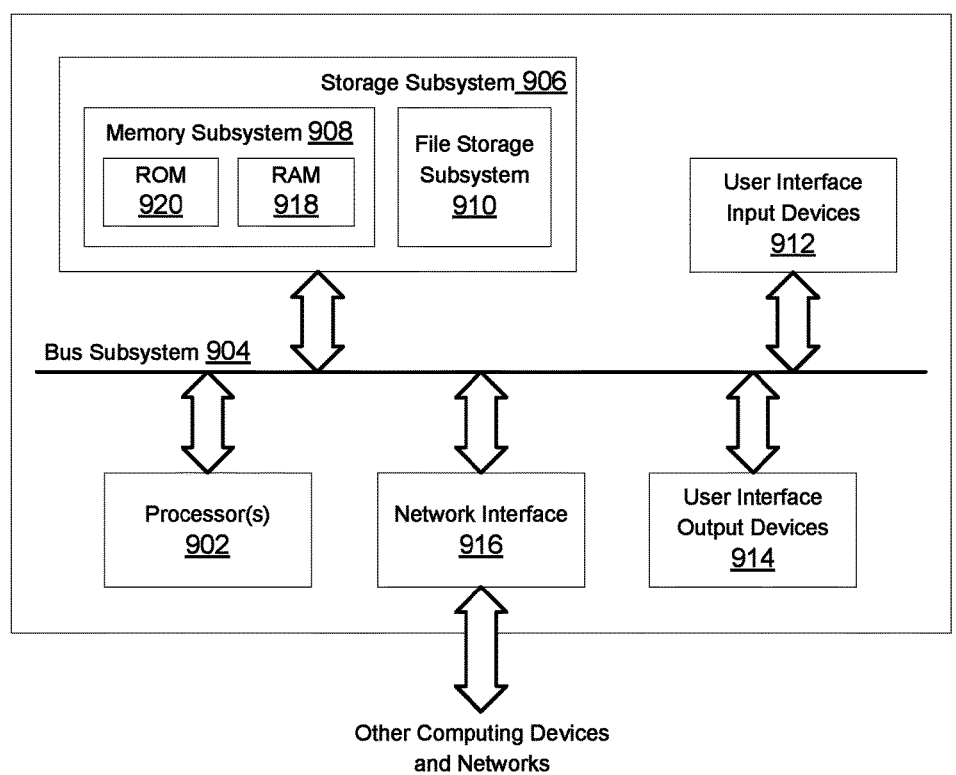
FIG. 9 depicts a simplified block diagram of a computing system for implementing some of the examples described herein, according to at least one example.

At block 410, a control system may be initialized when, for example, a gateway such as gateway 124, 210, or 350 is booted. During the initialization, the serial numbers of the inverters, meters and energy storage devices, the location of the meters, the inverters' power rating, the inverters' fallback limits, and the non-export regulation parameters may be loaded on the gateway, for example, from a configuration file or persisted by control server 120. The inverters and energy storage devices may be configured based on their default settings. For example, the dynamic power control setting of an inverter may be enabled, and a default time out for the PV system may be set based on the regulation to, for example, 30 seconds such that the PV system may be turned off during the time-out period if a restriction imposed by the regulation is violated. During the initialization, power ramp up or down time and fallback active power limit for the inverters may also be set. The energy storage devices, such as electrical water heaters, may also be set to their default configurations. For example, an electric water heater may be set to zero baseline power to enable direct control of the EWH's target power level, rather than a control relative to the non-zero baseline. Once the initialization process is completed, process 400 proceeds to a main control loop including blocks 420 and 430 to issue set point commands to the inverters and the EWHs based on daily or monthly export data and instantaneous net load value. In various embodiments, the function at block 410 can be performed by, for example, control server 128 and gateway 124 of FIG. 1, gateway 210 of FIG. 2, and gateway 350 of FIG. 3 as described above, and computing system 900 as illustrated in FIG. 9 and described in detail below.

At block 420, process 400 may determine whether a system end event, such as system maintenance, system failure, user shut-off, or preset shut-off time, has occurred or is about to occur. If so, process 400 may end such that, for example, the system maintenance may be performed or the system failure may be handled. The maintenance time may be set at a time, for example, between 10 PM and 4 AM local time. A system failure may occur if energy has been exported to the grid for a period of time longer than a threshold set by the regulation, such as 30 seconds. A system failure may also occur if any meter or PV output measurement result is not available. A user may shut off the control system manually, for example, under severe weather condition. The control system may also be shut off at a preset shut-off time, for example, 8 PM. If no system end event has occurred, process 400 proceeds to block 430. In various embodiments, the function at block 420 can be performed by, for example, control server 128 and gateway 124 of FIG. 1, gateway 210 of FIG. 2, and gateway 350 of FIG. 3 as described above, and computing system 900 as illustrated in FIG. 9 and described in detail below.

At block 430, a control operation may be performed to determine a net load at the site, determine appropriate operating points for the inverters and controllable loads, and issue commands to the inverters and/or controllable load to set the operating points for the inverters and/or the controllable load. Various examples of the control operation at block 430 are described below with respect to FIGS. 5 and 6. After the control operation is successfully performed, process 400 may proceed to block 420 and determine whether another control operation should be performed, and, if so, perform the control operation again. The operations at blocks 420 and 430 may be performed continuously to control the inverters and energy storage devices until a system end event as described above has occurred. In some embodiments, the operations at blocks 420 and 430 may be performed every half second, every second, every 5 seconds, every 10 seconds, every 15 seconds, or longer, which may be determined based on at least one of the response time of PV generation system (including the inverter) and/or the controllable load, or the sampling rates of the gateway and/or the meters and inverters. In various embodiments, the function at block 430 can be performed by, for example, energy storage device 112, PV inverter 106, control server 128, and gateway 124 of FIG. 1, inverters 204 and 206, meter 214, energy storage device 220, and gateway 210 of FIG. 2, and inverter 310 and gateway 350 of FIG. 3 as described above, and computing system 900 as illustrated in FIG. 9 and described in detail below.

It is noted that, in FIG. 4, an operation may have additional steps not included in the figure. Some operations may be optional, and thus may be omitted in various embodiments. Some operations described in one block may be performed together with operations at another block. Additional operations may be added. For example, a wait time or delay may be added after block 430. Furthermore, embodiments of the method may be implemented in hardware, software, firmware, middleware, microcode, hardware description languages, or any combination thereof.

Figure 5:
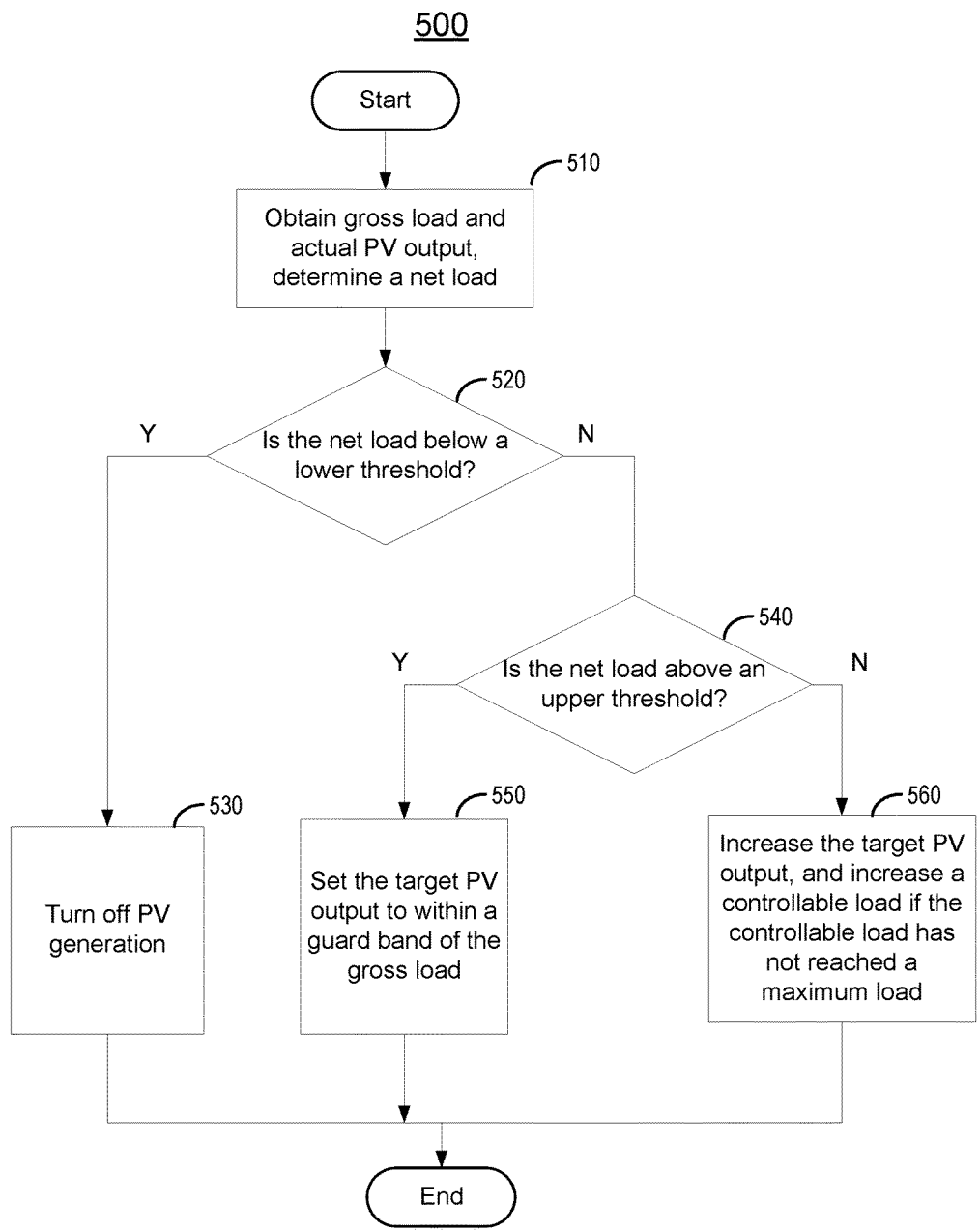
FIG. 5 is a flow chart illustrating an example control operation for controlling PV production.

FIG. 5 is a flow chart 500 illustrating an example of the control operation at block 430 for controlling PV production. In flow chart 500, the gross electric load, actual PV output, and/or net load of a site may be monitored and new set points for the inverters and the energy storage devices with controllable storage load may be set to prevent exporting energy back to the grid.

At block 510, the gross electric load and the actual PV output of a site may be obtained. The gross electric load may be measured by, for example, meter 214 of FIG. 2. The actual PV output may be measured by the inverters, such as inverters 204 and 206 of FIG. 2 and inverter 310 of FIG. 3, using, for example, control/meter circuit 318 of FIG. 3. A gateway, such as gateway 124 of FIG. 1, gateway 210 of FIG. 2, and gateway 350 of FIG. 3, may read the measured gross electric load and the actual PV output from the inverters and the meters by polling the inverters and the meters. Alternatively, the inverters and the meters may periodically send the measurement results to the gateway spontaneously based on a preset schedule, such as once every second, twice every second, or more frequently. In some embodiments, the measurement results may be averaged if the sampling period is shorter than the response time of the inverters or the energy storage devices. The gateway, or a sever connected to the gateway, may determine the net load at the site, which is equal to the difference between the gross electric load and the actual PV production. For example, if the gross electric load is 1 kilowatts and the actual PV output is 800 watts, the net load of the site is 1 kilowatts–800 watts=200 watts. In some embodiments, the net load may be read directly from a meter connected between the site and the utility grid, such as meter 212 of FIG. 2. In various embodiments, the function at block 510 can be performed by, for example, control server 128 and gateway 124 of FIG. 1, meter 214, inverters 204 and 206, and gateway 210 of FIG. 2, and inverter 310 and gateway 350 of FIG. 3 as described above, and computing system 900 as illustrated in FIG. 9 and described in detail below.

At block 520, the gateway or the server connected to the gateway may determine whether the net load is below a lower threshold. The lower threshold may be a guard band to prevent the exportation of excess PV energy caused by the inaccuracy of the measurements or fluctuations in the PV production and gross electric load. For example, the meters and/or the inverters may have measurement errors of about ±2%, a user may turn on a home appliance at any time, and the weather condition may change over time. The lower threshold may be set based on the accuracy of the meters and empirical data. In some embodiments, the lower threshold may be set to, for example, 5% of the nominal output power rating of the inverters. For example, if two inverters are used at the site and each has a nominal output power rating of 6 kilowatts, the lower threshold may be set to 600 watts. The lower threshold may be changed as needed during the operation of the control system. If the net load is below a lower threshold, the site may be at risk of exporting excess PV energy to the grid, and flow chart 500 may proceed to block 530 to turn off the PV generation until the next decision time. Otherwise, flow chart 500 may proceed to block 540. In various embodiments, the function at block 520 can be performed by, for example, control server 128 and gateway 124 of FIG. 1, gateway 210 of FIG. 2, and gateway 350 of FIG. 3 as described above, and computing system 900 as illustrated in FIG. 9 and described in detail below.

At block 530, the gateway or the server connected to the gateway may send a command to the inverters to turn off PV generation, i.e., set the target output power of the inverters to 0 watt. As described above with respect to FIG. 3, the inverters may be turned off by turning off a switch connected to the main panel. Alternatively or additionally, the DC-DC converter, or the DC-AC inverter, may turn off the inverters. In various embodiments, the function at block 530 can be performed by, for example, control server 128 and gateway 124 of FIG. 1, inverters 204 and 206 and gateway 210 of FIG. 2, and inverter 310 and gateway 350 of FIG. 3 as described above, and computing system 900 as illustrated in FIG. 9 and described in detail below.

At block 540, the gateway or the server connected to the gateway may determine whether the net load is equal to or above an upper threshold. The upper threshold may be set to a value that could indicate that the net load is high and the risk of exporting excess PV energy to the grid is very low. The upper threshold may also be set based on the accuracy of the meters and empirical data. In some embodiments, the upper threshold may be set to, for example, 10% of the nominal output power rating of the inverters or higher. If it is determined that the net load is equal to or above the upper threshold, flow chart 500 may proceed to block 550; otherwise, flow chart 500 may proceed to block 560. In various embodiments, the function at block 540 can be performed by, for example, control server 128 and gateway 124 of FIG. 1, gateway 210 of FIG. 2, and gateway 350 of FIG. 3 as described above, and computing system 900 as illustrated in FIG. 9 and described in detail below.

At block 550, the gateway or the server connected to the gateway may send a command to the inverters to set the target PV output from the inverters to a value that is a guard band value less the measured gross electric load if the value is equal to or below the nominal output power rating of the inverters. The guard band may be set to prevent exporting excess PV energy to the grid caused by the inaccuracy of the measurements or fluctuations in the PV production and gross electric load. The guard band may be set based on the accuracy of the meters and empirical data. In some embodiments, the guard band may be set to the lower threshold described above with respect to block 520. For example, the guard band may be set to, for example, 5% of the nominal output power rating of the inverters. In some embodiments, the guard band may be set to the middle point between the lower threshold and upper threshold. As described above with respect to FIG. 3, the target output power of the inverters may be set by controlling DC-DC converter 312, the DC-AC inverter 314, or the filter/protection/switch circuit 316 using control/meter circuit 318. When more than one inverters are used, the target output power may be distributed evenly to the inverters if the inverters have the same output power rating, or the target output power may be distributed to the inverters proportionally based on their output power ratings. In various embodiments, the function at block 550 can be performed by, for example, control server 128 and gateway 124 of FIG. 1, inverters 204 and 206 and gateway 210 of FIG. 2, and inverter 310 and gateway 350 of FIG. 3 as described above, and computing system 900 as illustrated in FIG. 9 and described in detail below.

At block 560, the gateway or the server connected to the gateway may send a command to the inverters to increase the target PV output from the inverters by a small amount, such as, for example, 1% or 2% of the nominal output power rating of the inverters, or 20% or 25% of the lower threshold. A command may also be sent to a controllable storage load, such as an EWH or a battery described above, to increase the load of the controllable storage load by an amount approximately equal to the increase in the target PV output from the inverters. For so long as the net load remains relatively constant—indicating that the PV output has increased in step with the controllable load, the process may continue to increment the target PV output and the controllable load in a subsequent control operation. If the target PV output from the inverters is at a maximum rating of the inverters, commands may not be sent to the inverters and the controllable storage load such that the inverters and the controllable storage load may keep their most recent settings. Alternatively, a command may be sent to keep the target PV output from the inverters at the maximum rating of the inverters, and a command may be sent to the controllable storage load to keep the load unchanged. Similarly, if the controllable storage load is at the maximum load of the controllable storage load, the inverters and the controllable storage load may keep their most recent settings. Alternatively, if the controllable storage load is at the maximum load, a secondary energy storage device, such as a battery, a heater, or an air conditioner, may use the excess PV energy. In other aspects, a hierarchy or set of preference rules may be used to share increased PV output with two or more controllable loads. For example, in a system that includes both an EWH and a battery, the EWH may be prioritized until the water reaches a particular temperature and then the battery may be used. In further examples, the EWH and battery may share increased PV output equally or may be prioritized differently at different times of day. In the following control loops, the operations in flow chart 500 may be repeated, and the target PV output from the inverters and the load of the controllable storage load may be increased incrementally until the net load falls outside the band between the lower threshold and the upper threshold. In various embodiments, the function at block 560 can be performed by, for example, control server 128 and gateway 124 of FIG. 1, inverters 204 and 206, gateway 210, and energy storage device 220 of FIG. 2, and inverter 310 and gateway 350 of FIG. 3 as described above, and computing system 900 as illustrated in FIG. 9 and described in detail below.

It is noted that, in FIG. 5, an operation may have additional steps not included in the figure. Some operations may be optional, and thus may be omitted in various embodiments. Some operations described in one block may be performed together with operations at another block. For example, the operations in block 520 and 540 may be combined, and the gateway or the server connected to the gateway may determine whether the net load is below the lower threshold, above the upper threshold, or between the upper threshold and the lower threshold. Based on the results of the determination, flow chart 500 may proceed to blocks 530, 550, and 560 accordingly. Additional operations may be added. Furthermore, embodiments of the method may be implemented in hardware, software, firmware, middleware, microcode, hardware description languages, or any combination thereof.

Figure 6:
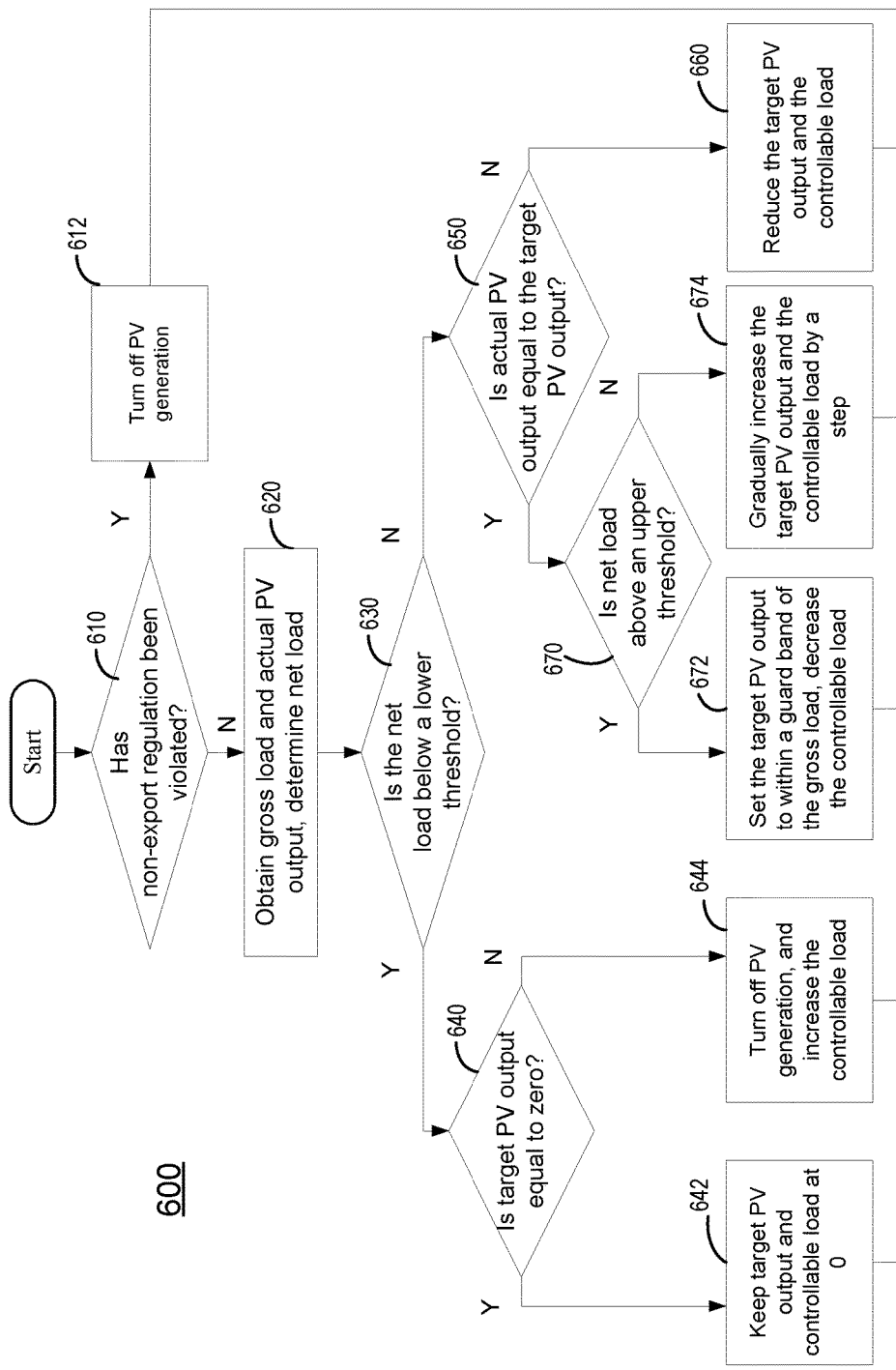
FIG. 6 is a flow chart illustrating an example control operation for controlling PV production, according to some embodiments.

FIG. 6 is a flow chart 600 illustrating another example of the control operation at block 430 of FIG. 4 for PV production control, according to some embodiments. Flow chart 600 includes some blocks that are similar to blocks in flow chart 500 of FIG. 5. Flow chart 600 also includes additional blocks that may be implemented in some embodiments of this disclosure. As in flow chart 500, the functions at various blocks of flow chart 600 can be performed by, for example, energy storage device 112, PV inverter 106, control server 128, and gateway 124 of FIG. 1, inverters 204 and 206, meter 214, energy storage device 220, and gateway 210 of FIG. 2, and inverter 310 and gateway 350 of FIG. 3 as described above, and computing system 900 as illustrated in FIG. 9 and described in detail below.

At block 610, the gateway or control server may determine whether a non-export rule (in some cases this may be based on government or utility regulations) has been violated at a site. For example, the non-export rule may specify the maximum amount of PV energy that may be exported to the grid in a day, a week, or a month. The non-export rule may specify the duration that the excess PV energy may be allowed to feed back to the grid, for example, no longer than 10, 20, or 30 seconds. The non-export rule may specify the number of times in a day that the PV energy is allowed to export to the grid. If it is determined that the non-export regulation has been violated, the PV system may need to be reset or turned off for a period of time at block 612. If the non-export rule has not been violated, flow chart 600 may proceed to block 620.

At block 612, an operational rule may direct the PV system to be turned off for a period of time, such as 30 seconds, an hour, or a day, as a penalty, depending on the regulation that has been violated. When the PV generation is turned off, a controllable load, such as energy storage device 220, may also be turned off.

At block 620, the gross electric load and the actual PV output of the site may be obtained, and the gateway or a server connected to the gateway may determine the net load at the site based on the gross electric load and the actual PV output, as described above with respect to block 510 of FIG. 5.

At block 630, the gateway or the server connected to the gateway may determine whether the net load is below a lower threshold as described above with respect to block 520 of FIG. 5. The lower threshold may be a guard band to prevent unintentional exportation of excess PV energy caused by the inaccuracy of the measurements or fluctuations in the PV production and gross electric load, as described above with respect to block 520 of FIG. 5. If the net load is below the lower threshold, the site may be at risk of exporting excess PV energy to the grid, and flow chart 600 may proceed to block 640. Otherwise, flow chart 600 may proceed to block 650.

At block 640, it is determined if the target PV output has been set to 0 most recently. If the target PV output has been set to 0 most recently, flow chart 600 may proceed to block 642, where the target PV output may be kept at zero, as described above with respect to block 530 of FIG. 5. If the average target PV output has been set to 0 most recently, it is likely that the controllable load is turned off also. The controllable load may be kept at 0. In this way, because the PV generation is turned off, there is no risk of exporting PV energy to the grid. If the target PV output has not been set to 0 most recently, flow chart 600 may proceed to block 644, where, as at block 642, the target PV output may also be set to zero, while the controllable load may be increased from the previously set value by a small amount, such as for example, 1% or 2% of the nominal output power rating of the inverters, or 20% or 25% of the lower threshold. In some implementations, if the target PV output has not been set to 0 most recently, the target PV output may be decreased from the previously set value, instead of being set to zero.

At block 650, it is determined whether the actual PV output is equal to the target PV output. A PV system may perform this test in order to determine whether more PV energy can be generated by increasing the target PV output setting of the inverters and be used to power the controllable load for energy storage. In many cases, for example, because of the weather condition, the actual PV output cannot reach the maximum power rating of the inverters or even the target PV output set for the inverters. In some cases, it is difficult for the system to know the maximum value of the actual PV output that can be achieved at a given time.

When the target PV output is set to the maximum output power rating of the inverters, the actual PV output may indicate the maximum output power that can be generated at a given time. For example, if the maximum output power of the inverters is 6 kilowatts and the target PV output of the inverters is set to 6 kilowatts, the actual output from the inverters at a given time may be anywhere between 0 and 6 kilowatts, such as 4 kilowatts, which represents the maximum possible PV output that can be achieved by the PV system at the given time.

However, if the target PV output is not set to the maximum power rating of the inverters, the system may or may not be able to determine the maximum possible PV output that can be generated by the PV system at the given time. If the actual PV output of the inverters is below the target PV output of the inverters, the actual PV output may represent the maximum possible PV output that can be generated by the PV system at the given time. For example, for a 6-kilowatt inverter, if the target PV output is set at 3 kilowatts and the actual PV output is 2 kilowatts at a given time, the maximum possible PV output that can be generated by the PV system at the given time is 2 kilowatts. However, if the actual PV output of the inverter is equal to the target PV output of the inverters, the system may not be able to determine the maximum possible PV output that can be generated by the PV system at the given time. For example, if the target PV output is set to 3 kilowatts for a 6-kilowatt inverter and the actual PV output is 3 kilowatts, the maximum possible PV output that can be generated by the PV system at the given time may be a value between 3 kilowatts and 6 kilowatts, rather than 6 kilowatts.

In any case, if the actual PV output is less than the target PV output set for the inverters, the actual PV output indicates the maximum possible PV output at the moment, and flow chart 600 may proceed to block 660 where the target PV output of the inverter may be reduced because the PV system cannot generate the most recent target PV output. If the actual PV output is equal to the target PV output set for the inverters, the PV system has be able to generate more power than the current actual PV output, and flow chart 600 may proceed to block 670 where the target PV output of the inverter may be increased.

At block 660, because the PV system cannot generate the most recent target PV output, the target PV output of the inverters may be reduced to the measured actual PV output. In some cases, the target PV output of the inverters may be set to a value within a guard band of the gross electric load of the site if the value is below the measured actual PV output. The guard band may be set to a value equal to or greater than the lower threshold, for example, the middle point between the lower threshold and the upper threshold. The load of the controllable load may be decreased accordingly by, for example, a value equal to the difference between the new target PV output and the most recent target PV output.

At block 670, because the PV system may be able to generate more power than the current actual PV output, the gateway or the server connected to the gateway may first determine whether the net load is equal to or above an upper threshold as described above with respect to block 540 of FIG. 5, in order to determine the new target PV output for the PV system to generate more power as quickly as possible without violating the non-export regulation. The upper threshold may be set to a value as described above with respect to block 540 of FIG. 5. If it is determined that the net load is equal to or above the upper threshold, flow chart 600 may proceed to block 672; otherwise, flow chart 600 may proceed to block 674.

At block 672, as in block 550 of FIG. 5, the gateway or the server connected to the gateway may send a command to the inverters to increase the target PV output from the inverters to a level that is a guard band value less the gross electric load of the site, or the maximum power rating of the inverters if the gross electric load minus the guard band value is greater than the maximum power rating of the inverters. The guard band may be set as described above with respect to block 550 of FIG. 5. Optionally, because the new target PV output may not be achieved as desired, for example, due to the weather condition, a command may be sent to the controllable load to decrease the load of the controllable load by a value, for example, equal to the difference between the new target PV output and the most recent target PV output, such that the net load can be decreased.

At block 674, as in block 560 of FIG. 5, the gateway or the server connected to the gateway may send a command to the inverters to increase the target PV output from the inverters by a small amount, such as, for example, 1% or 2% of the nominal output power rating of the inverters, or 20% or 25% of the lower threshold. A command may also be sent to the controllable load to increase the load of the controllable load by an amount approximately equal to the increase in the target PV output of the inverters, such that the net load of the site will remain at a value between the lower threshold and the upper threshold. If the target PV output of the inverters is at the maximum output rating of the inverters, the target PV output of the inverters is not changed. Similarly, if the controllable load is at the maximum load of the controllable load, the inverters and the controllable load may keep their most recent settings. In this way, the target PV output of the inverters and the load of the controllable load may be increased incrementally until the net load falls outside the band between the lower threshold and the upper threshold.

V. Example Results

Figure 7A:
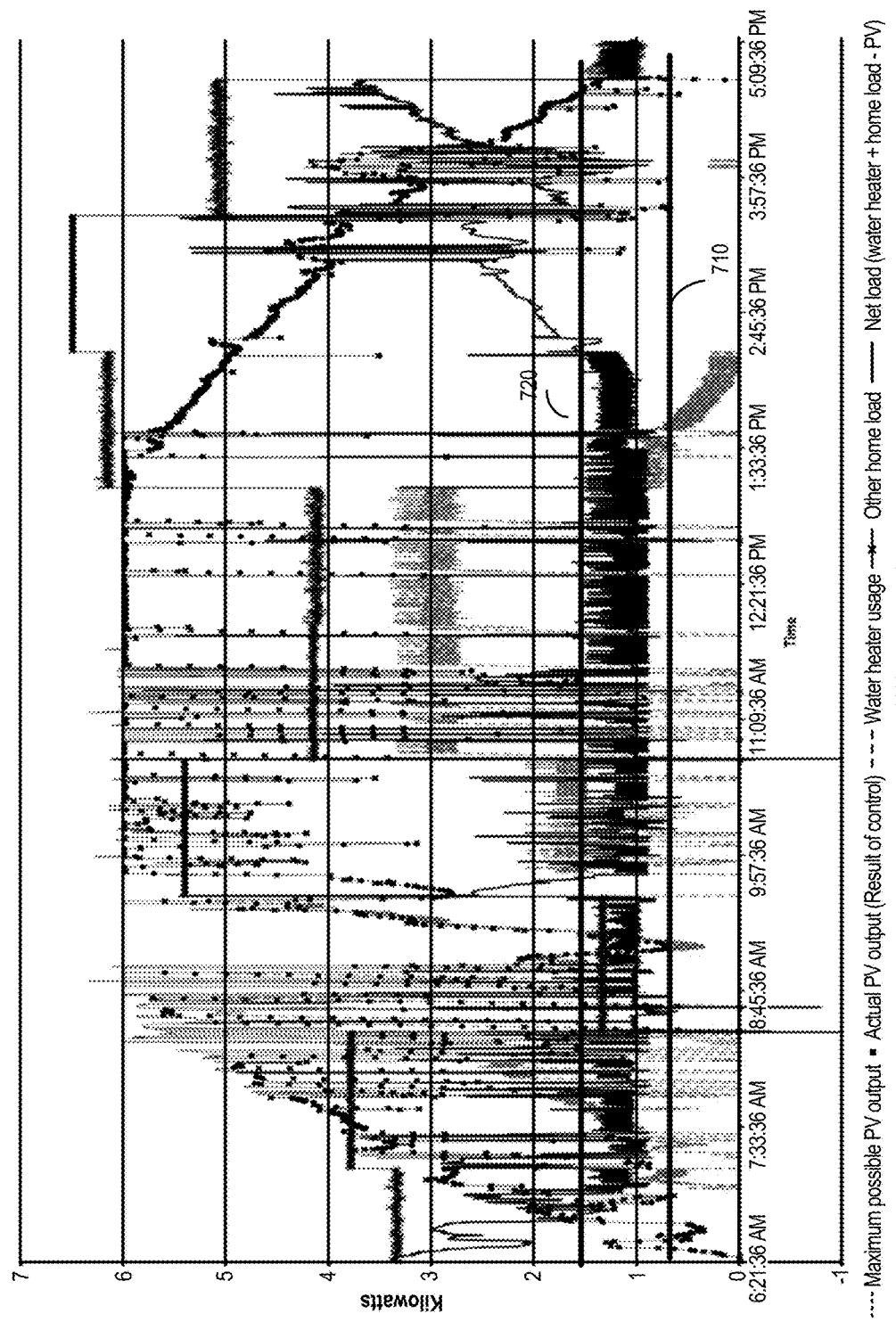
FIG. 7A illustrates example simulation results using a PV production control system according to some embodiments.

FIG. 7A illustrates example simulation results using a PV production control system at a residential site according to some embodiments. Simulation results of the maximum possible PV output, the actual PV output, the electrical water heater usage, other home appliance load, and the net load of the site from 6 AM to 6 PM in a day is plotted in the figure. As shown in FIG. 7A, for a majority time of the day, the actual PV output matched the maximum possible PV output, and thus the PV generation was maximized. At the same time, the net load of the site was kept at a low level but was mostly above lower threshold 710 that is greater than zero, which indicates that very little PV energy was exported to the grid.

Between about 8:30 AM and 9:30 AM, the maximum possible PV output varied a lot. The system needed time to respond to the changes in the maximum possible PV output. Therefore, there was a larger discrepancy between the maximum possible PV output and the actual PV output.

At about 8:30 AM, other home appliance load dropped rapidly from about 3.8 kilowatts to about 1.4 kilowatts, and the net load dropped below lower threshold 710 momentarily but quickly moved back to above lower threshold 710. Thus, some PV output was exported to the grid during a very short period of time. Similarly, at about 11 AM, the other home appliance load dropped rapidly, and the exporting of the PV energy to the grid occurred momentarily. Other than these two incidents, no PV energy was exported to the grid.

Between about 11 AM and 1 PM, the PV generation was high; the electrical water heater to store energy used a large amount of power. After 1 PM, the other home appliance load increased suddenly, the net load was high momentarily and dropped between lower threshold 710 and upper threshold 720 soon after because the load on the electrical water heater was reduced by an amount comparable to the increase in the other home appliance load. When the PV generation was low, for example, after 2:30 PM, and the net load was above an upper threshold 720, the electrical water heater was turned off, such that other home appliances that have a higher priority over the EWH could use the PV energy.

FIG. 7B is a zoomed-in view of the simulation results of FIG. 7A at around 9 AM. As shown in FIG. 7B, at about 8:25 AM, the other home appliance load dropped by about 2.4 kilowatts, and the net load of the site was below lower threshold 710. Thus, for a short period of time, the PV production and the electrical water heater were turned off to keep the net load between lower threshold 710 and upper threshold 720. Between about 8:25 AM and about 8:28 AM, the PV production and the load on the electrical water heater were increased incrementally until the actual PV production reached the maximum possible PV output. At about 8:28 AM, due to a change in the weather condition, such as under a partially cloudy weather condition, the maximum possible PV output dropped sharply and the net load increased sharply. The target PV output and the load on the electrical water heater were reduced accordingly to reduce the gross electric load and thus the net load. Afterwards, the PV production and the load on the electrical water heater were increased incrementally until the actual PV output reaches the maximum possible PV output or the load on the EWH reached the maxim value.

At about 8:35 AM, the maximum possible PV output dropped sharply again, causing the net load to increase to a level above upper threshold 720. The target PV output and the load on the electrical water heater were reduced accordingly to reduce the gross electric load and thus the net load. Afterwards, the target PV output and/or the load on the electrical water heater were increased again. However, due to another change in the weather condition and/or a delay between the increase of the target PV output and the increase of the load of the EWH, the net load dropped below lower threshold 710 again. In response, the target PV production and the load of the EWH were set to zero first and then gradually increased until the load on the EWH reached the maxim value at about 8:40 AM. Thus, when the weather condition causes fluctuations in PV production, for example, between about 8:15 AM to 9 AM in FIG. 7B, there may be a larger discrepancy between the maximum possible PV output and the actual PV output due to the response time of the control system in order to avoid exporting PV energy to the grid.

Between about 9 AM and about 9:30 AM, the maximum possible PV output increased gradually due to the gradual improvement in the weather condition. The actual PV output closely matched the maximum possible PV output to maximize the actual PV output, and the load on the EWH closely followed the actual PV output, thus keeping the net load between lower threshold 710 and upper threshold 720.

Figure 7C:
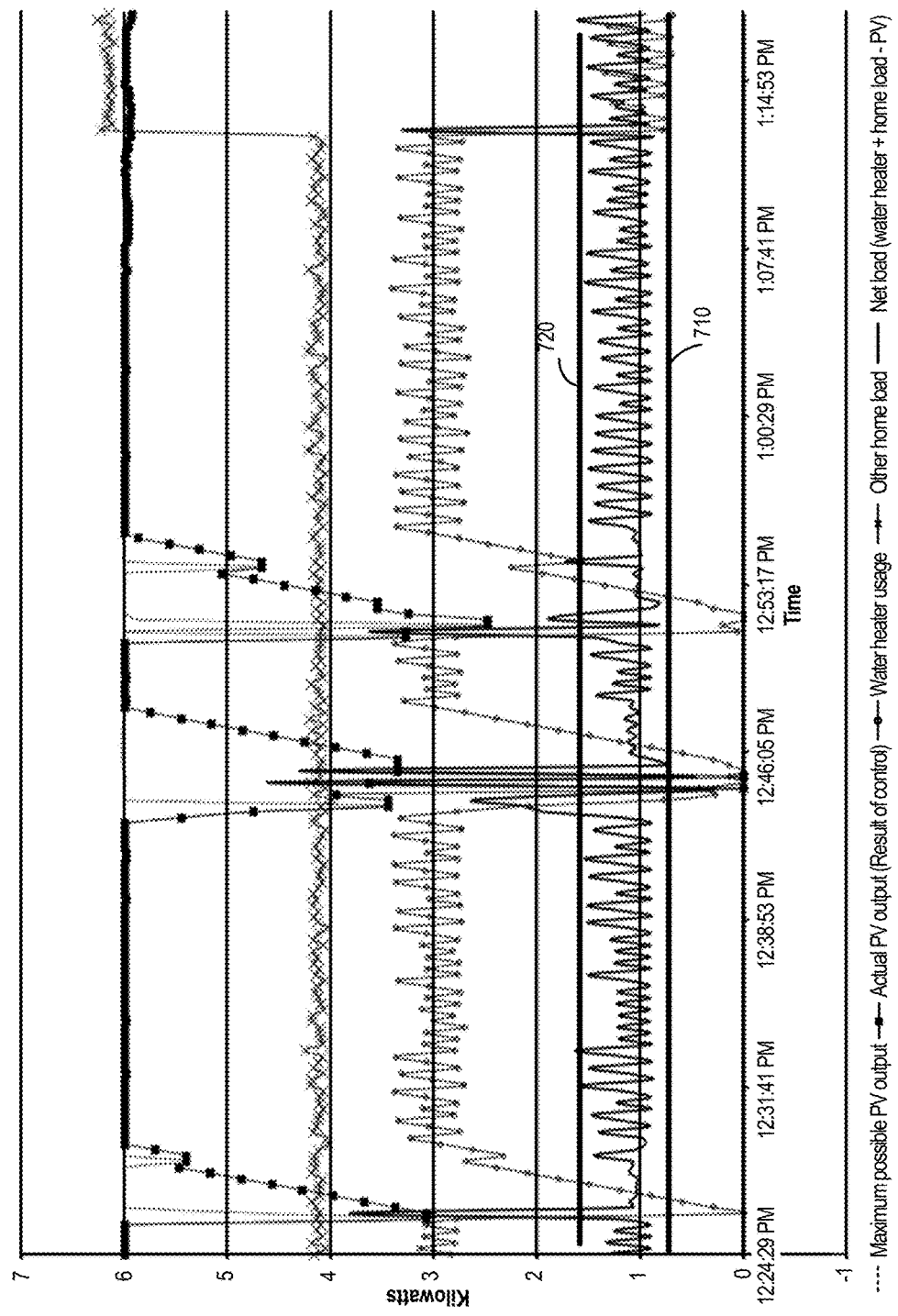
FIG. 7C is another zoomed-in view of the example simulation results of FIG. 7A.

FIG. 7C is a zoomed-in view of the simulation results of FIG. 7A at around 1 PM. FIG. 7C shows that, when the weather condition and the other home appliance load were relatively stable, the actual PV output matched the maximum possible PV output and a steady load may be set on the EWH to store energy that was not used by other home appliances. However, when the weather condition changed suddenly, a transition period might be needed to adjust the settings of the target PV output and the load of the EWH.

As described above, the PV production may be used in a prioritized order. For example, the PV production may be used to power the home appliance first. Excess PV energy may then be used by the EWH. If there is still PV energy remaining, the rechargeable battery may be charged by the remaining PV energy. For example, at about 1:10 PM, other home appliance load increased. Because other home appliances have a higher priority to use the generated PV energy over the EWH, the load on the EWH was decreased accordingly to keep the net load below upper threshold 720.

Figure 8A:
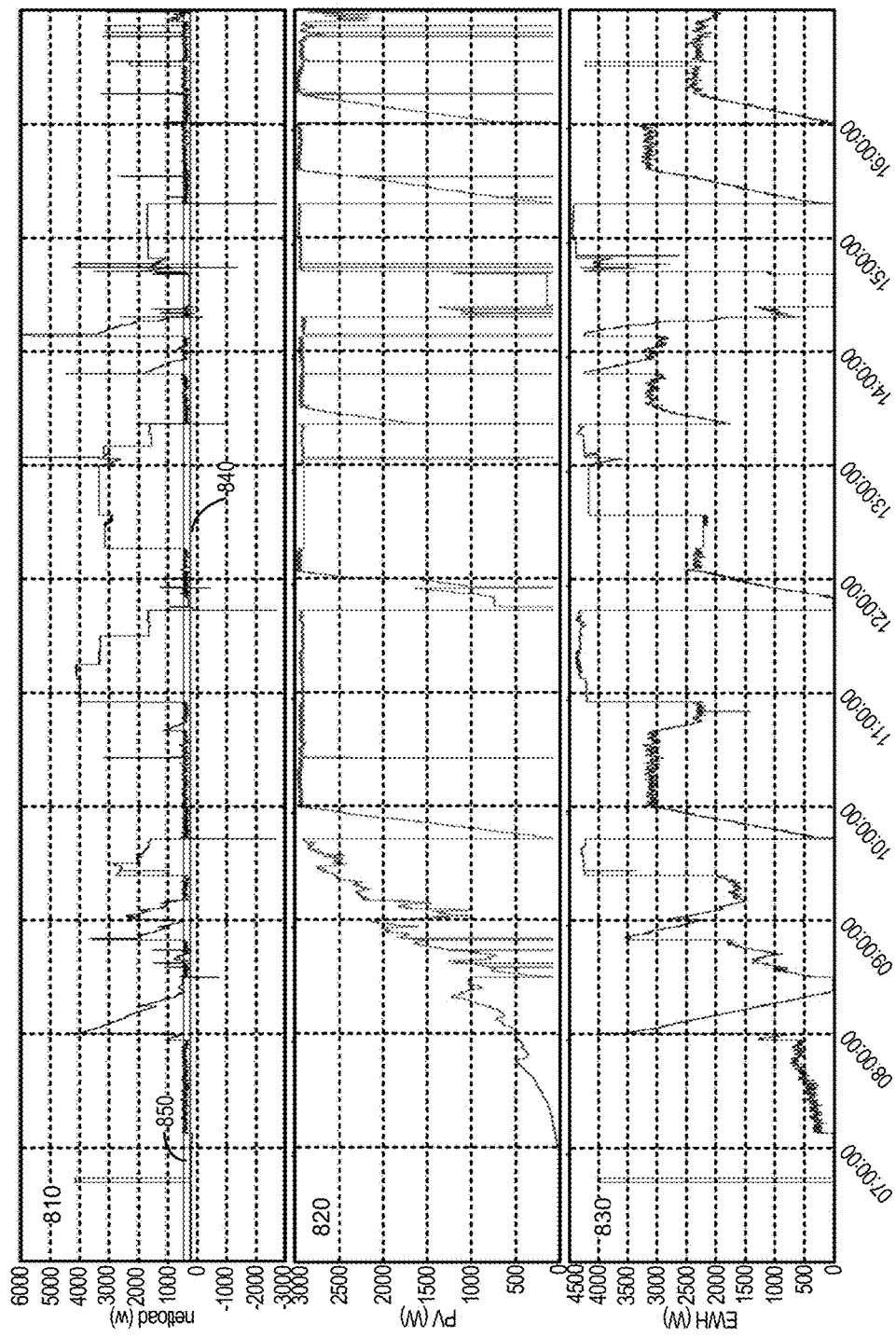
FIG. 8A illustrates example measurement results using a PV production control system according to some embodiments.

FIG. 8A illustrates example measurement results at a site using a PV production control system according to some embodiments. FIG. 8A includes a first curve 810 showing the net load of the site between 6 AM and 5 PM in a day, a second curve 820 showing the actual PV output at the site, and a third curve 830 showing the load of an electrical water heater used for storing excess PV energy. FIG. 8A shows that the actual PV output gradually increased from about 7:00 AM to about 10:00 AM and generally stayed at a high level until above 5:00 PM. A large portion of the actual PV output was used by the EWH during the day for energy storage. The net load of the site was generally above a lower threshold 840, and was below an upper threshold 850 for a majority of the time. Only during a few short periods of time, the net load of the site was below lower threshold 840.

Figure 8B:
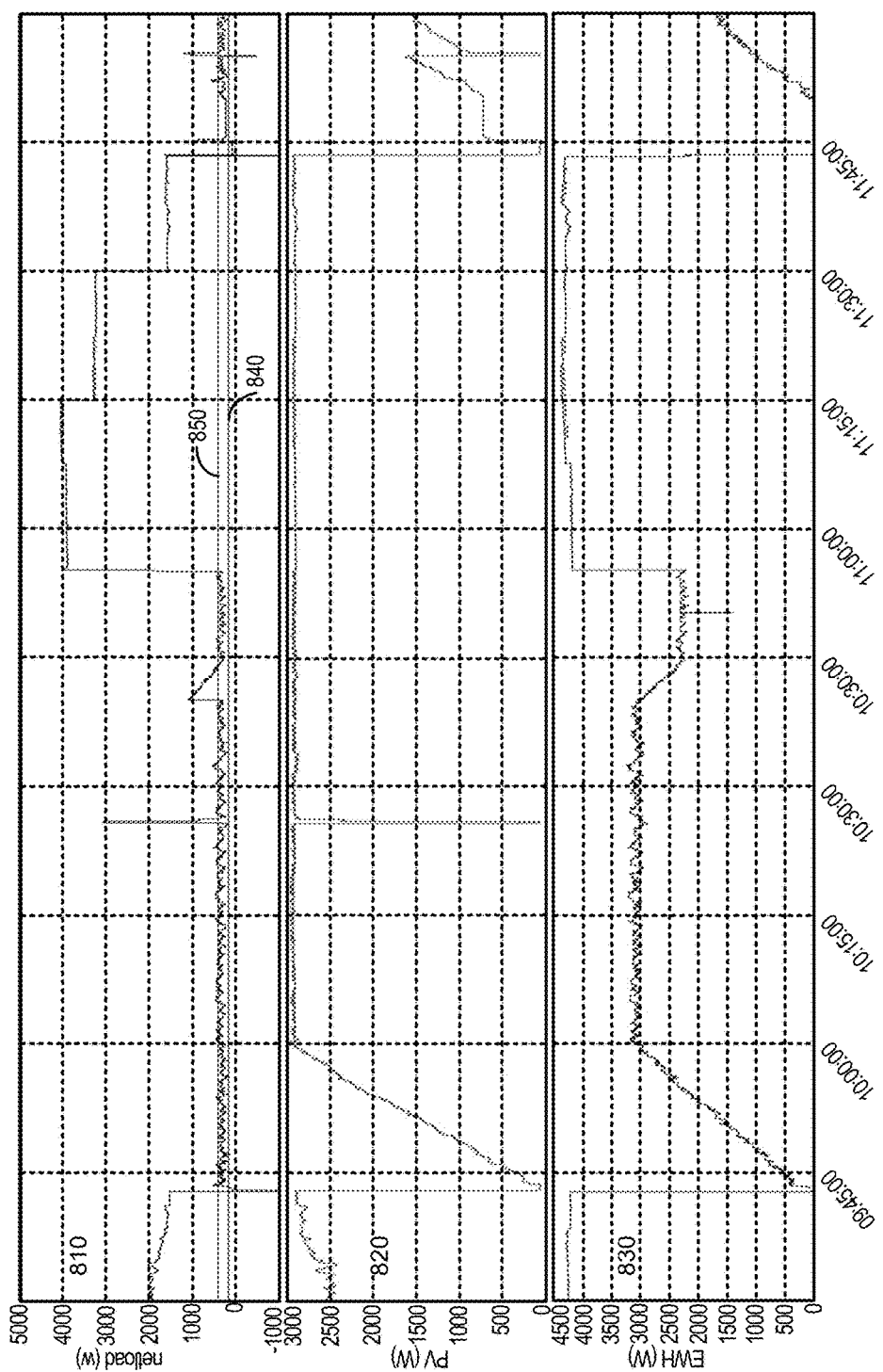
FIG. 8B is a zoomed-in view of the example measurement results of FIG. 8A.

FIG. 8B is a zoomed-in view of the example measurement results of FIG. 8A from about 9:30 AM to about 12:00 PM. FIG. 8B shows that, at about 9:45 AM, the net load of the system dropped below lower threshold 840 because, for example, some home appliances were turned off. As a result, the target PV output was reduced to about zero and the EWH was turned off, such that the net load was above lower threshold 840 again. After that, the PV output increased gradually until it reached a maximum value. At the same time, the load on the EWH was increased to follow the increase of the PV output. Thus, the net load of the site was kept between lower threshold 840 and upper threshold 850 until a sudden change in the home appliance load or the PV production occurred again.

VI. Computer System Example

FIG. 9 is a simplified block diagram of a computer system 900 according to an embodiment of the present disclosure. Computer system 900 can be used to implement any of the computer systems/devices (e.g., database server 182, web server 180, control server 128, power service 216, gateway devices 214, and server 220, 320 and 420) described with respect to FIGS. 1-4. As shown in FIG. 9, computer system 900 can include one or more processors 902 that communicate with a number of peripheral devices via a bus subsystem 904. These peripheral devices can include a storage subsystem 906 (comprising a memory subsystem 908 and a file storage subsystem 910), a user interface input devices 912, a user interface output devices 914, and a network interface subsystem 916.

In some embodiments, internal bus subsystem 904 can provide a mechanism for facilitating the various components and subsystems of computer system 900 to communicate with each other as intended. Although internal bus subsystem 904 is shown schematically as a single bus, alternative embodiments of the bus subsystem can utilize multiple buses. Additionally, network interface subsystem 916 can serve as an interface for communicating data between computer system 900 and other computer systems or networks (e.g., network 126 of FIG. 1 and/or network 218 of FIG. 2). Embodiments of network interface subsystem 916 can include wired interfaces (e.g., Ethernet, CAN, RS232, RS485, etc.) or wireless interfaces (e.g., ZigBee®, Wi-Fi, cellular, etc.).

In some embodiments, user interface input devices 912 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, the term "input device" is intended to include all possible types of devices and mechanisms for inputting information into computer system 900. Additionally, user interface output devices 914 can include a display subsystem, a printer, or non-visual displays such as audio output devices, etc. The display subsystem can be any known type of display device. In general, the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including a main random access memory (RAM) 918 for storage of instructions and data during program execution and a read-only memory (ROM) 920 in which fixed instructions may be stored. File/disk storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

Illustrative methods and systems for modeling energy efficiency and optimizing energy usage of a site are described above. Some or all of these systems and methods may, but need not, be implemented at least partially by architectures such as those shown at least in FIGS. 1-9 above. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices, which can be used to operate any of a number of applications. User devices or gateways can include any of a number of general purpose personal computers, such as desktop or laptop computers running a standard operating system, as well as cellular, wireless and handheld devices running mobile software and capable of supporting a number of networking and messaging protocols. In some embodiments, a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Scala, Java®, C, C# or C++, or any scripting language, such as Perl, Python or TCL, as well as any combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from those described above. For example, customized hardware might also be used. In some embodiments, particular elements might be implemented in hardware, software (including portable software, such as applets), or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of controlling photovoltaic (PV) production and storage at a site having an inverter and a controllable storage load, the method comprising:
   (a) monitoring a gross electric load of the site and an actual PV output from the inverter over time;
   (b) during a first time period, determining, with a processor, a net load at the site based on the gross electric load and the actual PV output during the first time period;
   (c) comparing, with the processor, the net load to at least one of a lower threshold or an upper threshold; and
   (d) controlling the PV production and storage by:
      when the net load is below the lower threshold, controlling the inverter to turn off PV production;
      when the net load is above the upper threshold, setting a set point of the inverter to a target PV output determined based on the gross electric load and a first guard band value; and
      when the net load is between the lower threshold and the upper threshold, increasing the set point of the inverter and controlling the controllable storage load to increase its load.

2. The method of claim 1, wherein the controllable storage load includes at least one of an electrical water heater or a rechargeable battery.

3. The method of claim 1, further comprising:
repeating (a)-(d) until a system end event occurs.

4. The method of claim 3, wherein the system end event includes at least one of a system maintenance, a system failure, or a user shut-off.

5. The method of claim 1, wherein the lower threshold is equal to or less than 5% of the inverter's nominal output power.

6. The method of claim 1, wherein the upper threshold is equal to or greater than 10% of the inverter's nominal output power.

7. The method of claim 1, further comprising:
when the net load is below the lower threshold, controlling the controllable storage load, with the processor, to increase the load of the controllable storage load.

8. The method of claim 1, further comprising:
when the net load is above the upper threshold, controlling the controllable storage load, with the processor, to reduce the load of the controllable storage load.

9. The method of claim 1, wherein increasing the set point of the inverter and the load of the controllable storage load when the net load is between the lower threshold and the upper threshold includes:
   increasing, with the processor, the set point of the inverter by a first value; and
   controlling the controllable storage load, with the processor, to increase the load of the controllable storage load by the first value.

10. The method of claim 9, wherein the first value is equal to a quarter of the lower threshold.

11. The method of claim 1, further comprising, when the net load is above the lower threshold:
   comparing, with the processor, the actual PV output with the set point of the inverter; and
   when the actual PV output is lower than the set point of the inverter, setting, with the processor, the set point of the inverter to a lower one of the actual PV output and the gross electric load minus a second guard band value.

12. The method of claim 1, wherein the first guard band value is equal to the lower threshold.

13. The method of claim 1, wherein controlling the controllable storage load includes sending control information to a server communicatively coupled to the controllable storage load.

14. A system for controlling photovoltaic (PV) production and storage at a site, comprising:
   a processor;

an inverter communicatively coupled to the processor;
a controllable storage load communicatively coupled to the processor; and
at least one meter communicatively coupled to the processor,
wherein the processor is configured to:
obtain a gross electric load of the site from the at least one meter and an actual PV output from the inverter;
determine, during a first time period, a net load at the site based on the gross electric load and the actual PV output during the first time period;
compare the net load to at least one of a predetermined lower threshold or a predetermined upper threshold; and
control the PV production and storage by:
when the net load is below the predetermined lower threshold, controlling the inverter to turn off PV production;
when the net load is above the predetermined upper threshold, setting a set point of the inverter to a target PV output determined based on the gross electric load and a first guard band value; and
when the net load is between the predetermined lower threshold and the predetermined upper threshold, increasing the set point of the inverter and controlling the controllable storage load to increase a load of the controllable storage load.

15. The system of claim 14, wherein the controllable storage load includes at least one of an electrical water heater or a rechargeable battery.

16. The system of claim 14, wherein increasing the set point of the inverter and the load of the controllable storage load when the net load is between the predetermined lower threshold and the predetermined upper threshold includes:
increasing the set point of the inverter by a first value; and
controlling the controllable storage load to increase the load of the controllable storage load by the first value.

17. The system of claim 14, wherein the first guard band value is equal to the predetermined lower threshold.

18. An article comprising a non-transitory storage medium including machine-readable instructions stored thereon that are executable by a processor to:
monitor a gross electric load of a site from a meter and an actual photovoltaic (PV) output from an inverter at the site;
during a first time period, determine a net load at the site based on the gross electric load and the actual PV output during the first time period;
compare the net load to at least one of a lower threshold or an upper threshold; and
control PV production and storage at the site by:
when the net load is below the lower threshold, controlling the inverter to turn off PV production;
when the net load is above the upper threshold, setting a set point of the inverter to a target PV output determined based on the gross electric load and a first guard band value; and
when the net load is between the lower threshold and the upper threshold, increasing the set point of the inverter and controlling a controllable storage load to increase a load of the controllable storage load in correlating control operations.

19. The article of claim 18, wherein increasing the set point of the inverter and controlling a controllable storage load to increase a load of the controllable storage load in correlating control operations comprises:
increasing the set point of the inverter incrementally by a first amount until the controllable storage load does not respond with a correlating load increase; and
lowering the set point of the inverter by a second amount.

20. The article of claim 18, wherein the first guard band value is equal to the lower threshold.

* * * * *